Aug. 14, 1934.    A. SCHRADER    1,969,860
PLOW
Original Filed March 21, 1932
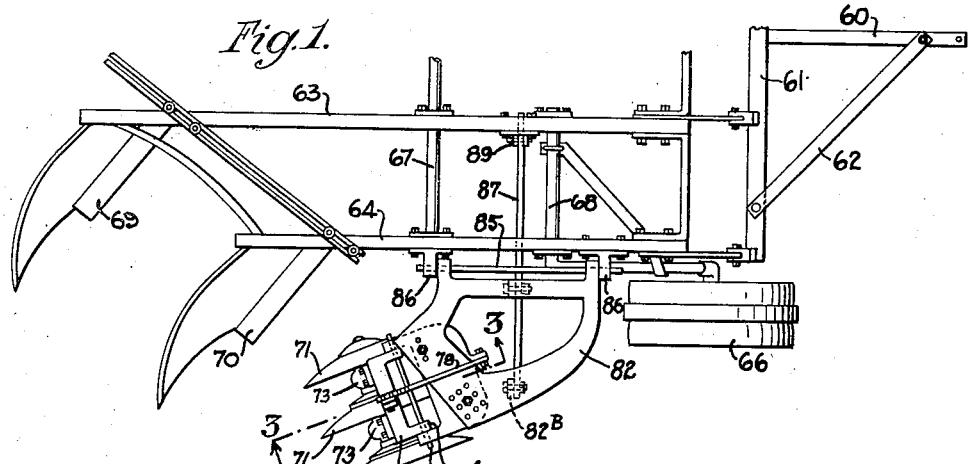
Inventor
Albert Schrader
by Frank J Schraeder Jr
Attorney Patented Aug. 14, 1934

1,969,860

UNITED STATES PATENT OFFICE 1,969,860

PLOW

Albert Schrader, Timken, Kans.

Original application March 21, 1932, Serial No. 600,177. Divided and this application January 2, 1934, Serial No. 705,025

5 Claims. (Cl. 97—6)

This application is a division of my co-pending application filed March 21, 1932, Serial No. 600,177.

This invention relates generally to plows and has particular reference to a plow attachment for gang plows to facilitate the plowing of corners of fields.

The invention is especially adaptable for use in connection with tractor-drawn plows and has among its objects to provide a novel gang disc attachment particularly for mold-board type of plows.

Another object of the invention is to provide an attachment of the character described which is simple in design, rigid and durable in construction, and which embodies the necessary flexibility for satisfactory operation.

With the above and other objects in view, my invention consists of the novel construction, arrangement and combination of the various parts and members shown in preferred embodiment in the attached drawing, described in the following specification and particularly pointed out in the appended claims.

Referring to the drawing:

Fig. 1 is a plan view of a portion of a tractor-drawn gang plow embodying my invention.

Fig. 2 is a side elevation of the portion of the plow embodying my invention.

Fig. 3 is an enlarged cross-section taken on line 3—3 of Fig. 1.

Fig. 4 is a cross-section taken on line 4—4 of Fig. 2, showing the support and connection of my improvement to the beams of the plow frame.

Fig. 5 is an enlarged cross-section taken on line 5—5 of Fig. 4.

Fig. 6 is an enlarged plan view of an adjustable bracket member for supporting the gang of disc plows.

Referring now to my preferred form of construction and arrangement in a corner plow attachment as shown in the drawing, a hitch is provided which consists of a draw bar 60 connected at one end to a tractor machine in any suitable manner, and at the other end to a cross bar 61. A brace 62 may be provided between the draw bar and the cross bar.

The hitch is suitably connected to the plow beams 63 and 64 which form part of the usual plow frame which is provided with the necessary rear caster wheel and a pair of forward wheels 65 and 66, mounted on respectively bent axles 67 and 68.

The beams 63 and 64, as shown in Figs. 1 and 2, support respectively the plow bottoms 69 and 70.

The gang disc corner-plow attachment comprises a plurality of discs 71 which are suitably mounted on a single shaft 72 rotatably supported in suitable bearings 73 having upwardly disposed extensions 73$^A$ with slotted holes 73$^B$ therein to afford vertical adjustment of the extensions 73$^A$ relatively to the bolts 74 fixedly held in the supporting member 75.

The gang disc supporting member 75 is a casting having a pair of spaced depending extensions in which the bolts 74 are positioned and to which the bearing extensions 73$^A$ are secured. The upper end of the casting is provided with a pair of integral ears 75$^A$ for pivotal connection on the rod 76 which is securely held in the extending integral ears 77$^A$ of the adjustable bracket member 77. The ears 77$^A$ are spaced a distance to embrace the outsides of ears 75$^A$.

The cast adjustable bracket member 77 is substantially a plate member having integral ears 77$^A$ on one side and on the opposite side an integral ear 77$^B$ in which is mounted a pivot bolt 78 for the segment 79.

The bracket 77 is provided with a plurality of holes 80 and 81 for bolt connection underneath the laterally disposed cast supporting frame 82. The bolt holes 81 are on an arc whose center is the bolt hole 80 to thereby afford angular adjustment of the bracket 77 and disc plows 71 relatively to the longitudinal center line of the plow frame and beams 63 and 64.

The supporting frame 82 is provided with a plurality of holes with which the holes 80 and 81 register.

The disc-supporting member 75 is also provided with an integral extension 75$^B$ for connection of the operating lever 83 which is provided with a spring actuated bolt latch 84 adapted to lock the lever 83 in desired position on the segment 79 to thereby retain the gang of discs in the selected position.

The supporting frame 82 is formed with a pair of integral ears 82$^A$ for pivotal support upon the rod 85 which extends between the cast brackets 86 which are securely mounted to beam 64.

To support the frame 82 in lateral position I provide the frame 82 with a pair of depending integrally cast ears 82$^B$ to which is securely bolted a bar 87, and which bar extends under the beams 63 and 64 and is connected with a readily breakable pin 88 of hardwood or the like, to a bracket 89 mounted on the beam 63.

It is obvious that any undesirable severe jolt or sudden obstruction in the path of movement of the gang of disc 71 will shear the pin 88 and cause an upwardly swinging movement of the frame 82 about its pivotal support 85 to thereby permit the upward movement of the gang of disc 71 without injury to the disc or any parts of the plow.

From the above it will be observed that I have provided a novel corner plow to facilitate the plowing of corners which under ordinary operations cannot be plowed by a tractor drawn plow.

I claim:

1. A corner plow attachment for tractor-drawn gang plows comprising a supporting member, pivotally mounted at its upper end, a plurality of rotatably mounted disc plows supported at the lower end of said supporting member, means for raising and lowering said supporting member to raise and lower said disc plows, means for retaining said supporting member in position whereby said plurality of disc plows are held in either raised or lower position, and an adjustably mounted bracket to which said supporting member is pivotally mounted, said bracket being adjustable laterally relatively to the longitudinal center of the tractor-drawn gang plow.

2. A corner disc plow attachment as embodied in claim 1 and including a horizontally disposed supporting frame supported from the beams of the plow frame, means for adjustably securing said bracket member to said supporting frame, and wherein said plurality of disc plows include a rotatable support, a plurality of bearings for said rotatable support, a standard extending upwardly from each bearing, and means adjustably connecting the upper ends of said standards with said supporting member.

3. An attachment of the character described for tractor-drawn gang plows comprising a pivotally mounted supporting member, a plurality of rotatably mounted disc plows carried at the lower end of said supporting member, said disc plows being adjustable vertically relatively to said supporting member, a laterally adjustable bracket member to which said supporting member is pivotally mounted, a supporting frame laterally supported from the beams of the gang plows, said bracket member being adjustable angularly in a lateral plane relatively to said supporting frame to which said bracket is secured, and adjustable means for retaining said pivotally mounted disc supporting member in selected raised or lowered position.

4. In combination with a plow, a corner plowing attachment comprising a plurality of rotatable disc plows, a single shaft for said disc plows, a plurality of bearings for said shaft, a pivotally mounted supporting member for said bearings, a bracket having pivotal means to which said supporting member is pivoted, means cooperating with said bracket for raising and lowering said plurality of disc plows, a frame pivotally mounted on the plow structure, and means for connecting said bracket to said frame, said bracket being adjustable laterally relatively to said frame.

5. In combination with a plow, a corner plowing attachment comprising plowing means, a pivotally mounted member adapted for supporting said plowing means, a bracket having pivotal means to which said member is pivoted, means cooperating with said bracket for raising and lowering said plowing means, a frame pivotally mounted on the plow structure, and means for connecting said bracket to said frame, said bracket being adjustable laterally relatively to said frame.

ALBERT SCHRADER.